United States Patent Office
2,730,506
Patented Jan. 10, 1956

2,730,506

ASPHALT EMULSIONS

Harry J. Sommer, Lafayette, Calif., assignor to Shell Development Company, Emeryville, Calif., a corporation of Delaware No Drawing. Application March 28, 1952,
Serial No. 279,223

7 Claims. (Cl. 252—311.5)

This invention relates to improved asphalt emulsions and to procedures for preparing the same. More particularly it is concerned with asphalt emulsions having predetermined viscosities and demulsibility characteristics.

Asphalt emulsions are broadly divided into two main classes. These comprise water-in-oil emulsions and oil-in-water emulsions. The present invention is concerned with the latter type.

The properties of asphalt emulsions which are important and which must be varied according to the contemplated utility comprise viscosity, resistance to electrolytes, stability and resistance to re-emulsification of the dehydrated emulsion products. The viscosity of the emulsion is important for such purposes as application to crowned roads and the like where the tendency to run off a sloping surface must be minimized. The resistance to breaking by electrolytes is also of considerable technical importance since many emulsions are mixed with cement, calcium chloride, lime and aggregates, although quick breaking emulsions may be preferred for certain purposes. The tendency to re-emulsify before complete curing is of especial importance when the asphaltic structure is laid down during wet weather. If the emulsifier employed sensitizes the dehydrated asphalt-film to re-emulsification, such as during a rain storm, the period during which such compositions may be employed is restricted to dry seasons. Many types of emulsifying agents have been utilized in the preparation of asphalt emulsions and these have been modified by the addition of numerous stabilizers, dispersants, surface-active agents, colloids and salts to provide specific properties, especially with respect to stability, in order to adjust the properties for particular uses.

Water dispersible soaps are the most common type of emulsifying agents employed in asphalt emulsions. In general they possess the disadvantage of failure to provide mechanical stability or lack of any effect upon the viscosity of the emulsion.

It is an object of the present invention to provide asphalt-water emulsions which may be varied in viscosity over a relatively large range. It is another object of this invention to provide these emulsions with a similar high degree of control of demulsibility. An important object of the present invention is to provide asphalt emulsions which yield asphalt-films by dehydration which have improved resistance to re-emulsification. Other objects will become apparent during the following discussion.

Now, in accordance with this invention, it has been found that the viscosity and demulsibility of oil-in-water type asphalt emulsions can be closely regulated by a particular distribution and combination of emulsifying agents therein. More particularly, the viscosity can be controlled by incorporation of certain alkali metal or ammonium soaps of high molecular weight naphthenic acids in the asphalt phase of the emulsion, the proportion utilized being adjusted for viscosity control. Moreover, the demulsibility of the emulsion can be controlled to the same degree by incorporating selected but varying amounts of a water-dispersible soap-type emulsifying agent in the aqueous phase of the emulsion. An important supplementary property comprises the substantially increased resistance to re-emulsification of films laid down by means of said emulsion as compared with those prepared from emulsions which do not contain the naphthenic soaps in the asphalt phase.

In the preparation of the present emulsions, it is necessary to incorporate the naphthenic soaps in the asphalt prior to combining the aqueous phase and asphaltic phase. Moreover, the effect of viscosity control is obtained only by the use of ammonium or alkali metal soaps of naphthenic acids having molecular weights above about 250 and preferably above 400. These may be obtained during the refining of certain petroleum oils and, more particularly, during the refining of the lubricating oil fractions thereof.

It has been noted that naphthenic acids extracted by the caustic treatment of kerosene or gas oil may be useful as emulsifying agents but are relatively ineffective for the alteration of emulsion viscosity. Hence, the naphthenate soaps to be used in the present process and compositions are preferably obtained by first topping a crude oil to remove the non-lubricating oil materials and then distilling the topped crude (straight run residue) under reduced pressure to remove the distillate lubricating oil values from the remaining heavy residue (short residue or asphalt bottoms), the distillation preferably being carried out continuously in a fractionation tower from which various lube distillate fractions are withdrawn simultaneously, with the distillation being carried out so that the distillate lube components are intimately contacted in the distillation tower with an aqueous caustic solution and the resulting caustic extract of naphthenic acids (naphthenates) is withdrawn separately from the lube distillate fractions and the residue fraction. Dependent upon the specific type of crude oil it may be possible to obtain these naphthenic acids by caustic treatment of the crude oil without either topping or without previous distillation from wax or asphalt. However, in obtaining the desired naphthenic acid soaps from West Coast or Texas crudes, it is preferred practice to eliminate materials boiling both above and below the usual lubricating oil distillate fractions before the caustic extraction thereof. The caustic extract bottoms remaining after distillation of the lube material in presence of the caustic will contain asphalt (which was entrained in the lube distillate), some lubricating oil of extremely high viscosity and alkali metal soaps of naphthenic acids having the following general formulae:

(1) $C_nH_{2n-6}O_2$  (2) $C_nH_{2n-8}O_2$  (3) $C_nH_{2n-10}O_2$ and probably some of the series: $C_nH_{2n-4}O_2$.

For these formulae the number of carbon atoms, $n$, may vary from about 16 to about 40.

Thus, there would be present the soaps of the several acids of each series, representative soaps being as follows:

$C_{16}H_{27}COONa$ (1)
$C_{17}H_{29}COONa$ (1)
$C_{18}H_{31}COONa$ (1)
$C_{20}H_{33}COONa$ (2)
$C_{21}H_{35}COONa$ (2)
$C_{23}H_{39}COONa$ (2)
$C_{24}H_{39}COONa$ (3)
$C_{25}H_{41}COONa$ (3)
$C_{37}H_{65}COONa$ (3)

and possibly others which have not yet been isolated and identified.

If the naphthenic soaps are a mixture of a wide range with respect to molecular weights, it would appear to be preferable either (1) to fractionate the lubricant and (a) extract naphthenic acids only from the heavier lubricant cut for use in the asphalt and (b) extract naphthenic acids only from the lower lubricant cuts and the gas oil and kerosene cuts for use in the aqueous phase, or (2) to recover total range of naphthenates from all lubricant distillate material, acidify to naphthenic acids and then fractionate them.

A mixed base crude would contain some of the acids mentioned above and in addition would probably contain some acids of the series whose general formula is $C_nH_{2n-2}O_2$. The total acid content of this type crude is usually somewhat less than that of a "coastal type" asphaltic base crude.

These naphthenic acids usually have acid values between 75 and 200 mg. KOH per g. and molecular weights between about 300 and 750; preferably, however, the acids from which the soaps are derived have average molecular weights between 400 and 600 and acid values between about 90 and about 180. If low molecular weight naphthenic acids are employed in the soap formation, no viscosity effect is obtained and if extremely high molecular weight soaps are utilized the proportion required for emulsification becomes excessive. The described soaps may be those of inorganic alkaline monovalent cations such as ammonium or alkali metal, e. g., sodium, potassium or lithium, although sodium soaps are preferred. They are to be added to the asphalt prior to contact with the potential aqueous phase and should be present in amounts varying from about 0.5% to about 10% based on the weight of the asphalt.

The viscosity of the eventual emulsion will depend to a large degree upon the proportion of naphthenic soaps incorporated in the asphalt phase. It has been found that addition to the asphalt phase of these soaps is essential for viscosity effect since substantially no change in viscosity occurs if naphthenic soaps are incorporated solely in the aqueous phase. Likewise, it is a highly preferred practice to incorporate the whole crude naphthenate bottoms from the distillation of lubricating oil since the bottoms non-soap components appear to contribute materially to the quality of the emulsion and especially to the properties of the film resulting by dehydration of the same. As already pointed out, the bottoms from lubricating oil distillation in the presence of caustic not only contain the desirable type of naphthenic soaps but also comprise a small proportion of asphalt and, more important, a substantial amount of heavy lubricating oil components rich in lower molecular weight lubricating oil resins. These resins appear to be of a complex type capable of forming self-supporting films but also of especial importance in providing enhanced flexibility and homogeneity of asphalts. This property provides asphaltic films resulting from the dehydration of emulsions prepared according to this invention with improved weathering properties and resistance to mechanical attack. Hence, the asphalt phase (which may be readily and cheaply shipped to a site of utilization prior to emulsification) comprises asphalt, and minor proportions each of lubricating oil resins and oil soluble monovalent soaps of naphthenic acids. The asphalts also exhibit substantially improved ductility and flexibility. In some instances, sources of free or "sprung" naphthenic acids are available and are suitable for use in the present compositions upon resaponification. However, the bottoms from the lubricating oil distillation, as discussed above, are more effective for the production of asphalt compositions having optimum properties. The presence of the lubricating oil resins in the emulsion of this invention appear to promote the maximum stability against breaking in the presence of electrolytes and also provide the emulsion with resistance to settling and pellet formation.

A preferred practice for incorporating the subject naphthenic soaps in asphalts comprises simply warming the asphalt until it is relatively fluid and incorporating the naphthenic soaps or naphthenic lubricating oil still bottoms therein with stirring or other means of agitation.

The excellent properties of the emulsions, prepared as described herewith, are based in part upon dispersal of the soaps throughout each of the phases and not merely at the interface therebetween.

Asphalts containing naphthenic acids treated with aqueous caustic yield a product in which sodium naphthenate exists at the interface but the interior portions of the asphalt phase still contain naphthenic acid and essentially no naphthenate—thus the separated asphalt phase has a net free acidity—as contrasted with alkalinity in present case.

Emulsions can be prepared by simply adding water to the asphalt containing the subject naphthenate soaps. However, while the control in emulsion viscosity is evidenced by such a procedure, the resulting emulsions are highly unstable to the presence of electrolytes such as cement and the like. Upon contact with such electrolytes the emulsion immediately breaks. Hence, in accordance with this invention, this property of sensitivity to electrolytes is overcome by combining with the aqueous phase of the emulsion a soap type emulsifying agent. This soap should be of the water-dispersible type well-known for its emulsifying properties but specifically may comprise the above-described naphthenic soaps or soap-containing still bottoms from lubricating oil distillation. The soaps should be present in an amount between about 0.5% and about 10% by weight of the water to be utilized as the aqueous phase of the asphalt emulsions. Suitable soaps to be mixed with, or used in place of, the naphthenic soaps in the aqueous phase include the water-dispersible ammonium or alkali metal soaps of higher fatty acids, especially those having at least 8 carbon atoms in the molecule. Suitable acids to be used in the formation of soap emulsifiers include lauric acid, myristic acid, palmitic acid, oleic acid, ricinoleic acid, linoleic acid, linolenic acid, rosin type acids, such as abietic acid and mixtures of any two or more of the above types of acids. Mixtures of acids which may be employed in suitable soap formation include those derived from animal or vegetable sources, particularly those from tall oil, cocoanut oil, palm kernel oil, corn oil, cottonseed oil, sardine oil, soy bean oil, peanut oil; partially or completely hydrogenated animal and vegetable oils, carboxy acids produced by the oxidation of petroleum or paraffin wax, sulfonic acids and sulfate ester acids. Typical soaps include sodium tallate, potassium tallate, sodium abietate, potassium oleate, sodium petroleum sulfonate, etc.

It has been found that the dilution of the water-dispersible soap type emulsifying agent with from 1 to 20% by weight thereof of water, prior to addition of the agent to the main body of water, causes a remarkable reduction in the time required for the dispersion of the emulsifying agent in the aqueous phase.

These acids are converted to the soap form and must be incorporated in the water prior to incorporation of the water and the asphalt to form the asphalt emulsion. The proportion of soaps to be incorporated in the aqueous phase will depend upon the demulsibility desired in the final emulsion. While a high degree of demulsibility is undesirable for most road-building practices, the precise degree of stability to electrolytes will depend upon the particular road laying process or other utilization for which the emulsion is to be used. The degree of demulsibility of the eventual emulsion will vary inversely with the proportion of water dispersible soap type emulsifier added to the aqueous phase of the emulsion.

The following examples illustrate the advantages to be gained by the practice of the present invention:

EXAMPLE I

Asphalt emulsions (containing approximately equal weights of asphalt and water) were prepared wherein the aqueous phase contained 0.75% by weight of a potasium salt of tall oil. In the following samples those containing "heavy naphthenic bottoms" were modified by the residue obtained by treatment of lubricating oil with caustic during distillation of the same. The lubricating oil was obtained by distillation of a mixture of 3 parts Mt. Poso and 1 part Coalinga crudes. This residue contained approximately 60% by weight of a heavy (greater than 250 SSU at 100° F.) lubricating oil. The lubricating oil comprised at least 20% by weight of high molecular weight lubricating oil resins. The heavy naphthenic bottoms contained approximately 40% by weight of sodium naphthenates of naphthenic acids having an average molecular weight of approximately 580.

Table I

| Percent Heavy Naphthenic Bottoms in Asphalt | Percent Solids | S. F. Visc. at 122° F. | Demulsibility N/50 CaCl₂ | Roller Stability |
|---|---|---|---|---|
| 0 | 67.0 | 30 | 70 | 7.5 |
| 5 | 67.3 | 35 | | |
| 6 | 67.5 | 85 | 44 | 2.2 |
| 7 | 67.0 | 161 | 49 | 1.8 |
| 8 | 66.8 | 219 | 51 | 1.0 |

It will be noted according to the data in Table I that in the absence of any heavy naphthenic bottoms the emulsion had a low viscosity. Incorporation of the bottoms product rapidly increased the viscosity of the emulsion so that an emulsion containing 8% by weight of the bottoms, based on the asphalt, had a viscosity approximately 7 times as great as the sample containing no bottoms. The addition of naphthenic bottoms to the asphalt phase also greatly improved the mechanical stability of the emulsion as shown by the "roller stability." The significance of the latter property is reflected in the degree of separation which will take place when the emulsion is passed through a pump.

EXAMPLE II

The samples whose properties are given in Table II were prepared by dispersing the same naphthenic bottoms in either the asphalt or water phase or in both phases prior to emulsification.

Table II

| Wt. Percent Bottoms in Water Phase | Wt. Percent Bottoms in Asphalt | Viscosity¹ | Roller Stability |
|---|---|---|---|
| 2 | 0 | 14.7 | 3.5 |
| 2 | 10 | 42.5 | 2.2 (most stable) |
| 0 | 5 | 15.2 | 5.0 (least stable) |

¹ Relative Colas units at 55.0% solids, at 77° F.

According to the data in Table II, the absence of any bottoms in the water phase resulted in low mechanical stability. Likewise, the absence of any bottoms in the asphalt phase gave relatively unstable emulsions. However, when the bottoms were added separately to each of the two phases prior to emulsification, the emulsions subsequently formed showed substantial improvement in mechanical stability.

EXAMPLE III

When a residual asphalt containing naphthenic acids is intimately contacted with an aqueous caustic solution to make an oil-in-water emulsion and to provide sodium naphthenate as emulsifier by reaction of the caustic solution with naphthenic acids in the asphalt, unsatisfactory emulsions are formed, being both unstable and exhibiting no increase in viscosity. Analysis of the separated asphalt phase shows it to be acidic, and the asphalt contains therein substantially no sodium naphthenate but does show the presence of naphthenic acids in essentially the same proportion as originally present.

The roller stability test comprises rolling the emulsion in a cylinder containing a steel rod and determining the percentage of emulsion which breaks under the test conditions which are as follows:

Time _____Hour__ 2
R. P. M._____ 30
Temperature _____° F__ 70–90
Cylinder weight_____g__ 450
Sample weight_____g__ 200

The demulsibility test is described in ASTM Specification D-244.

I claim as my invention:

1. An asphalt emulsion of the oil-in-water type, the asphalt having dispersed therein a minor amount of alkali metal soaps of naphthenic acids having an average molecular weight above about 300 and the water phase of said emulsion having a water-dispersible soap dispersed therein, the proportion of said naphthenic soap being from about 0.5 to 10% based on the weight of the asphalt and the proportion of water-dispersible soap being from about 0.5% to 10% based on the weight of the water.

2. An asphalt emulsion according to claim 1 wherein the naphthenic acids have an average molecular weight above about 400.

3. An asphalt emulsion according to claim 1 wherein the naphthenic soaps are potassium soaps.

4. An asphalt emulsion of the oil-in-water type comprising an asphalt phase having dispersed therein from about 0.5% to about 10% by weight based on the asphalt of sodium soaps of naphthenic acids having an average molecular weight between about 400 and 600 and an aqueous phase having dispersed therein between about 0.5% and about 10% by weight based on the water of sodium soaps of tall oil acids, said soaps being dispersed in their respective phases prior to emulsification thereof.

5. An asphalt emulsion of the oil-in-water type, the asphalt having dispersed therein a minor amount of inorganic monovalent cation soaps of naphthenic acids having an average molecular weight above about 300 and the water phase of said emulsion having a water-dispersible soap dispersed therein, the proportion of said naphthenic soap being from about 0.5 to 10% based on the weight of the asphalt and the proportion of water-dispersible soap being from about 0.5% to 10% based on the weight of the water, said soaps being pre-formed before addition to each of the phases.

6. An asphalt emulsion of the oil-in-water type, the asphalt having dispersed therein a minor amount of ammonium soaps of naphthenic acids having an average molecular weight above about 300 and the water phase of said emulsion having a water-dispersible soap dispersed therein, the proportion of said naphthenic soap being from about 0.5 to 10% based on the weight of the asphalt and the proportion of water-dispersible soap being from about 0.5% to 10% based on the weight of the water, said soaps being dispersed in their respective phases prior to emulsification thereof.

7. An asphalt emulsion of the oil-in-water type, the asphalt having dispersed therein a minor amount of the product obtained by distillation of petroleum lubricating oils in the presence of sodium hydroxide, whereby a bottoms product comprising sodium soaps of naphthenic acids having an average molecular weight above about 300 and petroleum lubricating oil resins is obtained, and a water phase of said emulsion having a water-dispersible soap dispersed therein, the proportion of said naphthenic soap being between about 0.5 to 10% based on the weight of the asphalt, the proportion of water-dispersible soap being from about 0.5% to 10% based on the weight of the water.

References Cited in the file of this patent

UNITED STATES PATENTS

| | | |
|---|---|---|
| 2,027,584 | Gabriel | Jan. 14, 1936 |
| 2,332,542 | Watts et al. | Oct. 26, 1943 |
| 2,378,235 | Miles | June 12, 1945 |
| 2,406,823 | Fratis et al. | Sept. 3, 1946 |
| 2,431,891 | Rosencranse | Dec. 2, 1947 |
| 2,550,481 | Jense | Apr. 24, 1951 |